United States Patent [19]

Shiraishi

[11] Patent Number: 4,571,886
[45] Date of Patent: Feb. 25, 1986

[54] CONSTRUCTION OF DOOR IN MOTOR VEHICLE

[75] Inventor: Daiichi Shiraishi, Seto, Japan

[73] Assignee: Toyota Jidosha Kabushiki Kaisha, Japan

[21] Appl. No.: 631,883

[22] Filed: Jul. 18, 1984

[30] Foreign Application Priority Data

Jul. 18, 1983 [JP] Japan .............................. 58-111331[U]
Jul. 18, 1983 [JP] Japan .............................. 58-111332[U]

[51] Int. Cl.[4] .............................................. E05F 11/38
[52] U.S. Cl. ........................................ 49/374; 49/440
[58] Field of Search ................. 49/374, 375, 202, 227, 49/440

[56] References Cited

U.S. PATENT DOCUMENTS

| | | | |
|---|---|---|---|
| 4,240,227 | 12/1980 | Hagler et al. ..................... | 49/374 X |
| 4,417,419 | 11/1983 | Rossie et al. ..................... | 49/374 X |
| 4,457,111 | 7/1984 | Koike ............................... | 49/502 X |
| 4,490,942 | 1/1985 | Arnheim et al. ................. | 49/374 |

Primary Examiner—Kenneth Downey
Attorney, Agent, or Firm—Finnegan, Henderson, Farabow, Garrett & Dunner

[57] ABSTRACT

A window assembly for a motor vehicle door which includes a window pane having a window piece secured to one end. The window piece has a slide portion at a forward end offset toward the interior of the vehicle and is substantially crank-shaped in cross-section. A seal member is disposed on the side of the door frame and is in contact with the slide portion of the window piece on opposite sides thereof in a direction lateral to the window pane so the slide portion is slidable in the direction of opening or closing of the window pane. The seal member forms a seal between the door frame and the window piece. A sliding piece projects inwardly toward the interior of the vehicle and is secured to the window pane at a position closer to the center of the window pane than the window piece. A guide is formed on the door frame for guiding the sliding piece in the direction of opening or closing of the window pane and for regulating the lateral position of the window pane at a point through the sliding piece. The window piece also has an extension formed along the interior surface of the window pane which is connected to the sliding piece.

16 Claims, 8 Drawing Figures

CONSTRUCTION OF DOOR IN MOTOR VEHICLE

BACKGROUND OF THE INVENTION

1. Field of the Invention

This invention relates to construction of a door in a motor vehicle, and more particularly to construction of a door suitable for use in a so-called flush-surface type motor vehicle, wherein the outer surface of a vehicle body and the surface of a door glass are made flush with each other.

2. Description of the Prior Art

The air resistance during running of a motor vehicle at high speed may reach more than twice the rolling resistance.

From this point of view, there has been proposed the so-called flush-surface type motor vehicle therein, to reduce the air resistance, the outer surface of the vehicle body and the surface of the door glass are made flush with each other.

A door in the flush-surface type motor vehicle as described above should be constructed such that the outer surface of the door glass and the outer surface of a door frame are made substantially flush with each other when the door glass is fully closed. However, the door glass is sucked out due to a difference in pressure between the interior and the exterior of a compartment during running of the motor vehicle at high speed. There is such a disadvantage that, when the door glass floats up outwardly from the outer surface of the door, so-called wind breaking sounds occur and the air resistance is increased during running.

To obviate the above-described disadvantages, for example, there has been proposed construction of a door in a motor car, wherein, as described in Japanese Utility Model Kokai (Laid-Open) No. 158321/81 (Refer to FIG. 7), a door glass piece 2 having a forward end 2A offset toward a compartment 3 and being of a substantially crank shape in cross-section is secured to an end portion 1A of a door glass 1 and the aforesaid forward end or slide portion 2A of this door glass piece 2 is slidably guided by a guide groove 5 on a door frame 4 in a direction of opening and closing of the door glass 1, whereby the outer surfaces of the door glass 1 and the door frame 4 are made substantially flush with each other and the door glass 1 is prevented from being sucked outwardly.

In the drawing, designated at 6 is a seal rubber disposed in the guide groove 5 and additionally functioning as a guide brought into contact with the forward end 2A of the door glass piece 2, 7 a center pillar, 8 a door weather strip, 9 a frame molding, and 10 a door panel welded to the door frame 4, respectively.

With the above-described construction of the door in a motor vehicle, the door glass 1 can be prevented from being considerably sucked outwardly. However, the seal rubber 6 for guiding the slide portion 1A of this door glass 1 in the vertical direction, having need of elastically contacting the door glass 1 when the door glass 1 is opened or closed, to seal between the door glass 1 and the door frame 4, may be elastically deformed in a direction of the thickness of the door glass, whereby the holding of the glass 1 when the door glass is fully closed, is weak in the direction of the thickness of the door glass, and therefore, there are presented such disadvantages that the performance of preventing the door glass 1 from being sucked out should not necessarily be satisfactory and the looseness tends to occur.

To obviate the above-described disadvantage, there may be proposed that the seal rubber 6 be replaced by a hard material to prevent the looseness of the door glass 1. However, such a proposal may cause new problems that the sealing function and the controllability of opening or closing of the door glass are impaired.

As described in West German Patent Application No. 2809721 for example (Refer to FIG. 8), a guide groove 5 integral with the door frame 4 is formed at the side of the compartment 3 of the end portion 1A of the door glass 1 and a slide piece 11 secured to the rear surface (on the side of the compartment 3) of the end portion 1A of the door glass 1 is raised and engaged with the guide groove 5 in a manner to be movable in the vertical direction, so that the looseness in the direction of the thickness of the door glass 1 may be reduced.

However, in this case, the sealing between the door glass 1 and the door frame 4 is conducted by a door glass weather strip 12 being in contact with corners of the end portion 1A of the door glass 1 and the outer peripheral surface 12A of this door glass weather strip 12 and the outer surface 4A of the door frame 4 on the side of the outer periphery of this door glass weather strip 12 are made substantially flush with the outer surface of the door glass 1, whereby a portion of the door glass weather strip 12, which contacts the outer surface of the door glass 1 is small and the width of the door glass weather strip 12 is made small to make the door frame portion look slim, whereby it is impossible to satisfactorily seal between the door glass 1 and the door frame 4. Moreover, there have been presented such disadvantages that, if contact pressure of the door glass weather strip 12 and the outer peripheral surface 12A are increased to enhance the sealing function, then the door glass 1 cannot perform smooth opening and closing operations and the flush surface is impared.

SUMMARY OF THE INVENTION

It is therefore the primary object of the present invention is to provide construction of a door in a motor vehicle, wherein the looseness of a door glass is avoided and the surface flush is achieved without impairing the sealing function and the controllability of opening or closing of the door.

To this end, the present invention contemplates that the construction of a door in a motor vehicle according to the present invention comprises: a door glass piece secured to an end portion of a door glass, having a slide portion at a foward end offset toward a compartment and being of a substantially crank shape in cross-section; a seal member disposed on the door frame's side, being in contact with the slide portion of the door glass piece from opposite sides of the slide portion in a direction of the thickness off the door glass in manner to be slidable in the direction of opening or closing of the door glass, for sealing between the door frame and the door glass piece; a slider projected into the compartment and secured to the door glass at a position closer to the center of the door glass than the door glass piece; and a guide formed separately of the door frame, secured to the door frame, for guiding the slider in the direction of opening or closing of the door glass and regulating the position of the door glass at least in the direction of the thickness of the door glass through the slider; whereby a guide portion and a seal portion of the door glass are separated from each other to prevent the looseness of the door glass without impairing the sealing function and the controllability of opening or closing of the door.

To the above end, the present invention contemplates that the construction of a door in a motor vehicle according to the present invention comprises: a door glass piece secured to an end portion of a door glass, having a side portion at a forward end offset toward a compartment and being of a substantially crank shape in cross-section; a seal member disposed on the door frame's side, being in contact with the slide portion of the door glass piece from opposite side of the slide portion in a direction of the thickness of the door glass in a manner to be slidable in the direction of opening or closing of the door glass, for sealing between the door frame and the door glass piece; a slider projected into the compartment and secured to the door glass at a position closer to the center of the door glass than the door glass piece; and a guide formed integrally with the door frame, for guiding the slider in the direction of opening or closing of the door glass and regulating the position of the door glass at least in the direction of the thickness of the door glass through the slider; whereby a guide portion and a seal portion of the door glass are separated from each other to prevent the looseness of the door glass without impairing the sealing function and the controllability of opening or closing of the door.

To the above end, the present invention contemplates that a portion of the said door glass piece secured to the door glass is extneded along a side surface of the door glass on a compartment's side toward the center of the door glass to provide an extension and said extension together with said slider are fastened and fixed to said end portion of the door glass.

To the above end, the present invention contemplates that said door glass piece and said slider are formed integrally with each other.

To the above end, the present invention contemplates that an outer side portion of said door glass piece covering the outer surface of the door glass is removed.

To the above end, the present invention contemplates that an outer lip of said seal member is extended to provide an extension and an outer corner of the end portion of the door glass is covered by said extension.

To the above end, the present invention contemplates that said seal member is housed in a guide groove formed on a door frame and provided with an inner lip being in contact with the compartment's side of said slide portion, elongated between said guide groove and said guide from said seal member, whereby the length thereof in contact with said slide portion is enlarged.

DETAILED DESCRIPTION OF THE PREFERRED EMBODIMENTS

Description will hereunder be given of the embodiments of the present invention with reference to the drawings.

Figure 7:
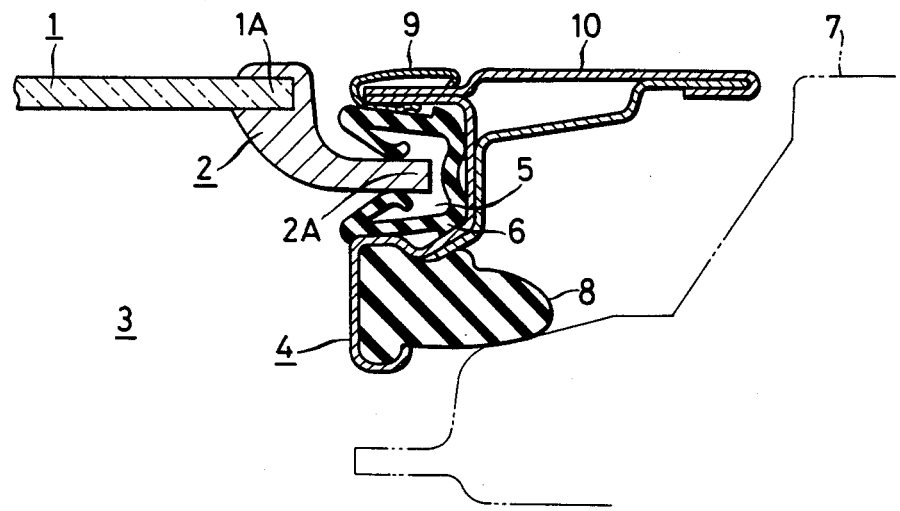
FIG. 7 is an enlarged sectional view taken along the line II—II in FIG. 1, showing a conventional door in a motor vehicle.
Figure 8:
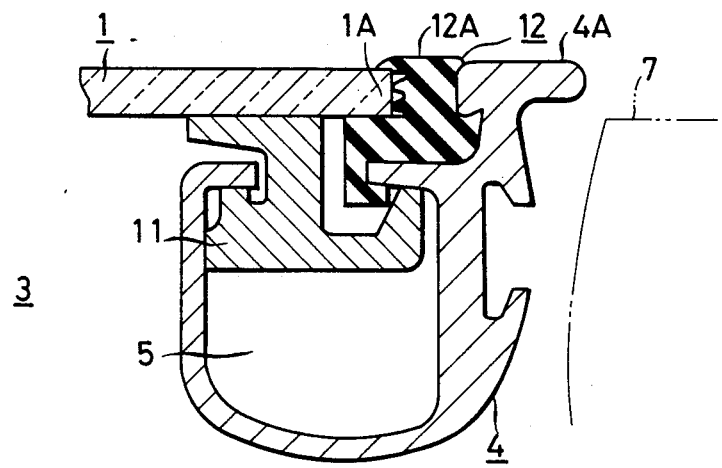
FIG. 8 is a sectional view similar to FIG. 7, showing the essential portions of another conventional door in a motor vehicle.

In this embodiment, corresponding reference characters as shown in FIGS. 7 and 8 indicate corresponding parts in construction of the conventional door in a motor vehicle throughout the figures, so that detailed description will be omitted.

Figure 1:
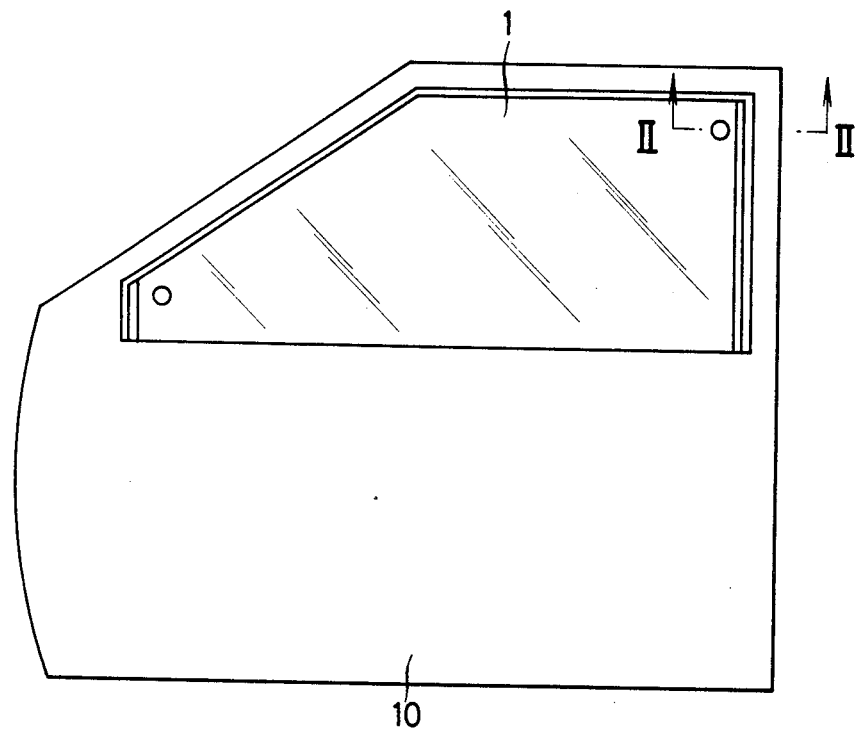
FIG. 1 is a front view showing a door of a motor vehicle, to which the present invention is to be applied.
Figure 2:
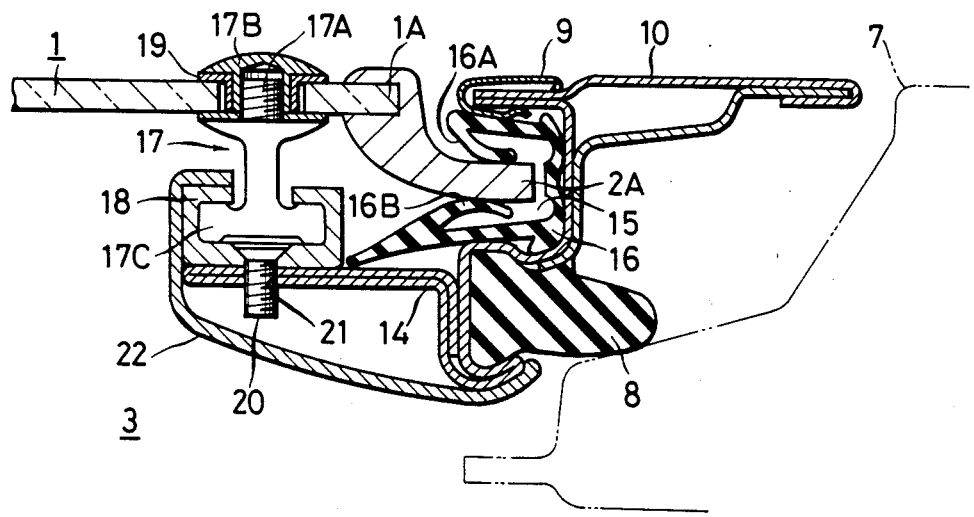
FIG. 2 is an enlarged sectional view taken along the line II—II of FIG. 1, showing an embodiment of construction of the present invention.

As shown in FIG. 2, according to this embodiment, construction of a door in a motor vehicle comprises: a door glass piece 2 secured to an end portion 1A of a door glass 1, having a slide portion 2A at a forward end offset toward a compartment 3 and being of a substantially crank shape in cross-section; a seal member 16 disposed on the side of a door frame 14, being in contact with the slide portion 2A of the door glass piece 2 from opposite sides of the slide portion 2A in a direction of the thickness of the door glass 1 in a manner to be slidable in the direction of opening or closing of the door glass 1, for sealing between the door frame 14 and the door glass piece 2; a slider 17 projected into the compartment 3 and secured to the door glass 1 at a position closer to the center of the door glass 1 than the door glass piece 2; and a guide 18 formed separately of the door frame 14, secured to the door frame 14, for guiding the slider 17 in the direction of opening or closing of the door glass 1 and regulating the position of the door glass 1 at least in the direction of the thickness of the door glass 1 through the slider 17.

Three sliders 17 are disposed at three positions including a top and a bottom end of a rear edge portion and a forward end portion of the door glass 1. As shown in FIG. 2, each of the three sliders 17 has a bolt 17A projected therefrom and extending through the door glass 1. A nut 17B extending through a hole 13 from out side of the door glass, is threadably coupled to the bolt 17A. Thus, the slider 17 is fastened and fixed to the door glass 1 through a filler 19.

A forward end of each of the sliders 17 in the direction of the compartment 3 is forward into a head 17C of an increased diameter. The guide 18 is formed into a substantially upwardly directed C-shape in cross-section, having coupled thereinto the head 17C of the slider 17, the head 17C being slidable in the direction of opening or closing of the door glass 1. The guide 18 is formed by means having high dimensional accuracy such as machining, extrusion molding and injection molding by use of a mold. On the other hand, the door frame 14 including a guide groove 15 and a channel portion 8A for supporting a door weather strip 8 is formed by continuously and integrally rolling a plate member.

In the drawing, designated at 20 is a screw for being threadably coupled into internal threads 21 formed in the door frame 14 to fasten and fix the guide 18 to the door frame 14, and 22 a garnish covering a side surface of the door frame 14 on the side of the compartment 3.

The seal member 16 is housed in the guide groove 15 and provided with lips 16A and 16B which are in contact with the slide portion 2A from opposite sides thereof in the direction of the thickness of the door glass 1.

The lip 16B on the side of the compartment 3 of the seal member 16 is elongated between the guide groove 15 and the guide 18, whereby the length thereof in contact with the slide portion 2A is enlarged.

In this embodiment, the door glass 1 is firmly held and guided by the guide 18 of the door frame 14 through the slider 17, so that an outward displacement of the door glass 1 and the generation of wind breaking sounds during high speed running of the motor vehicle can be reliably avoided. Moreover, there is no need for the seal member 16 to guide the door glass piece 2, whereby the seal member 16 may be formed of a satisfactorily soft material, the sliding resistance between the door glass piece 2 and the seal member 16 is reduced and the door glass piece 2 can avoid the looseness and the separation from the door glass 1.

Thus, there is no need for the seal member 16 to guide the door glass piece 2, so that the seal member 16 can be set with a satisfactory allowance of deflection in the direction of the door glass 1, thereby improving the sealing function.

Furthermore, any too excessive force is not applied to the seal member 16 at the time of moving of the door glass 1 in the vertical direction, so that the door glass 1 can be smoothly operated. Particularly, the guide 18 is formed separately of the door frame 14 and with high dimensional accuracy, whereby, as compared with the case where the guide 18 is formed by rolling means and the like continuously and integrally with the door frame 14, the guide 18 has high fit dimensional accuracy with the slider 17, the looseness is eliminated therebetween, the guide 18 can smoothly guide and firmly hold the door glass 1.

In consequence, it can be contemplated to achieve the avoidance of generation of the wind breaking sounds during running of a motor vehicle, improvements in the sealing function in and out of the door glass 1 and in the qualities of the parts therearound, the prevention of the door glass 1 from being sucked outwardly during high speed running of the motor vehicle and the avoidance of generation of unusual noises due to the vibrations of the door glass 1 during running of the motor vehicle and at the time of opening or closing of the door.

Moreover, the seal member 16 can be set with a satisfactory allowance of deflection in the direction of the door glass 1, so that a dispersion in positional relationship between the door glass piece 2 and the slider 17 caused during manufacture can be absorbed without impairing the controllability in opening or closing the door glass 1 and the sealing fuction of the seal member 16.

Additionally, in the above embodiment, the door glass piece 2 and the slider 17 are secured to the door glass 1 separately of each other, however, the present invention need not necessarily be limited to this, and, for example, a portion of the door glass piece 2 secured to the door glass in a first embodiment as shown in FIG. 2 is extended to provide an extension extending along the side surface of the door glass 1 on the side of the compartment 3 toward the center of the door glass 1, and this extension and the end portion 1A of the door glass 1 may be fastened and fixed to each other through the bolt 17A and the nut 17B of the slider 17.

In this case, there is such an advantage that the door glass piece 2 can be firmly fixed to the door glass 1 as compared with the first embodiment as shown in FIG. 2. The door glass piece 2 may be formed integrally with the slider 17.

In this case, it can be contemplated to decrease the number of parts, improve the assembling performance and reduce the cost.

Figure 3:
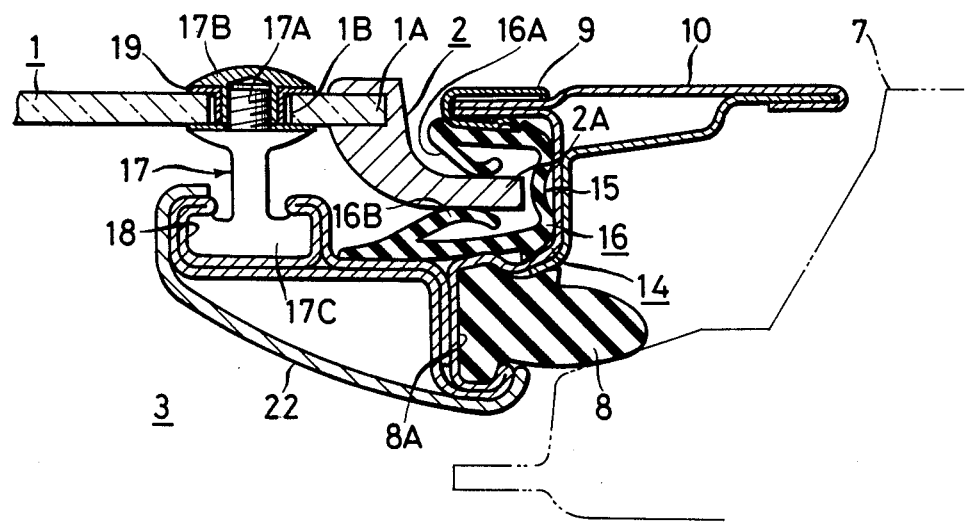
FIGS. 3 to 6 are sectional views similar to FIG. 2, showing a second to a fifth embodiments of the present invention.

Description will hereunder be given of a second embodiment of the present invention as shown in FIG. 3. In this second embodiment, the guide 18 in integrally formed on the door frame 14. More specifically, the guide 18 together with the guide groove 15 and the channel portion 8A for supporting the door weather strip 8 are formed by continuously and integrally rolling a plate member.

In this embodiment, the guide 18 is integrally formed with the door frame 14, so that these two members can be manufactured at a low cost and rendered light in weight. Additionally, there is such an advantage that necessity of adjusting the positional relationship between the guide 18 and the guide groove 15 are be eliminated.

Other arrangements and functions of this second embodiment are identical with the first embodiment shown in FIG. 2, and hence, same reference characters as shown in FIG. 2 are used to designate same or similar parts in FIG. 3, so that the detailed description will be omitted.

Figure 4:
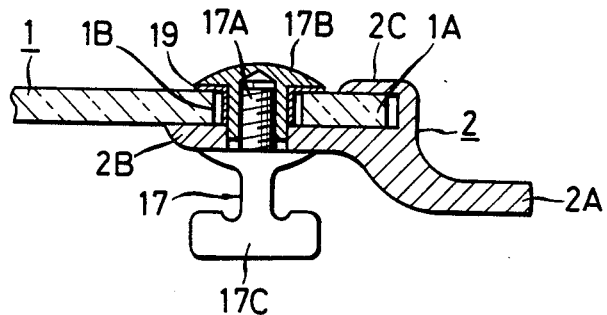

Description will hereunder be given of a third embodiment of the present invention shown in FIG. 4.

In this third embodiment, the portion of the door glass piece 2 secured to the door glass 1 in the first and the second embodiments as shown in FIGS. 2 and 3 is extended along the side surface of the door glass 1 on the side of the compartment 3 toward the center of the door glass 1 to provide an extension 2B and this extension 2B and the end portion 1A of the door glass 1 are fastened and fixed to each other through the bolt 17A and the nut 17B of the slider 17.

This embodiment can offer the advantage that the door glass piece 2 can be firmly fixed to the door glass 1 as compared with the first and the second embodiments as shown in FIGS. 2 and 3.

Figure 5:
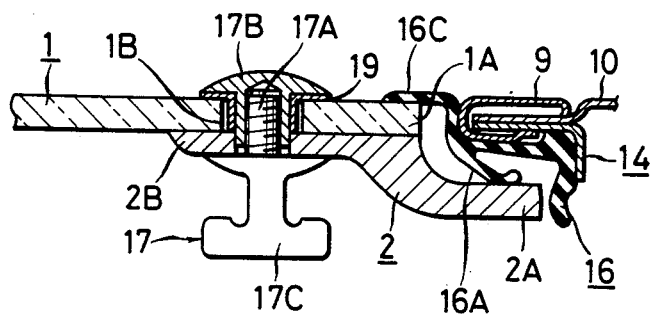

Description will now be given of a fourth embodiment of the present invention as shown in FIG. 5.

In this fourth embodiment, an outer side portion 2C of the door glass piece 2, covering the outer surface of the door glass 1 in the third embodiment as shown in FIG. 4 is removed.

In this fourth embodiment, the extension 2B is provided on the door glass piece 2 to increase the mechanical strength for securing the door glass piece 2 to the door glass 1, so that the outer side portion 2C can be removed.

Additionally, in this fourth embodiment, to protect the outer corner portion of the end portion 1A of the door glass 1, the outer lip 16A of the seal member 16 is extended to provide an extension 16C, and the outer corner porion of the end portion 1A of the door glass 1 is covered by this extension 16C.

In this fourth embodiment, the door glass piece 2 can be simplified in its construction, the door frame 14 looks small in its width to improve the appearance, the sealing function is improved and the surface flush is improved by the removal of the outer side portion 2C.

Figure 6:
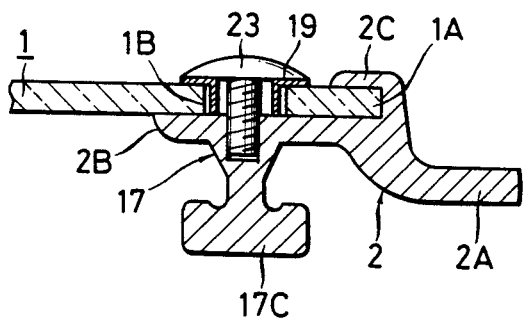

Description will now be given of a fifth embodiment of the present invention as shown in FIG. 6.

In this fifth embodiment, the door glass piece 2 and the slider 17 in the third embodiment as shown in FIG. 4 are integrally formed with each other.

In this fifth embodiment, a bolt 23 extending through a hole 1B from outside of the door glass 1 is threadably coupled into the slider 17, whereby the door glass piece 2 and the slider 17, which are integrally formed with each other, are fastened and fixed to the door glass 1.

In this embodiment, it can be contemplated to decrease the number of parts, improve the assembling performance and reduce the cost as compared with the first to the fourth embodiment.

What is claimed is:

1. A window assembly for a motor vehicle door, comprising:
 a window pane;
 a window piece secured to an end of said window pane, having a slide portion at a forward end offset toward the interior of the vehicle and being substantially crank shaped in crosssection;
 a seal member disposed on the side of a door frame and in contact with said slide portion on opposite sides thereof in a direction lateral to said window pane such that the slide portion is slidable in the direction of opening or closing of said window pane, forming a seal between said door frame and said window piece;
 a sliding piece projected toward said interior of the vehicle and secured to said window pane at a position closer to the center of said window pane than said window piece; and
 a guide formed on said door frame for guiding said sliding piece in the direction of opening or closing said window pane and regulating the position of said window pane at least in the direction of the width of said window pane through said sliding piece, said window piece having an extension formed along the interior surface of said window pane toward the center of said window pane and connected to said sliding piece.

2. A window assembly for a motor vehicle door as set forth in claim 1, wherein said window piece and said sliding piece are formed integrally with each other.

3. A window assembly for a motor vehicle door as set forth in claim 1, wherein the outside portion of said window piece covering the outer surface of said window pane is removed.

4. A window assembly for a motor vehicle door as set forth in claim 2, wherein the outside portion of said window piece covering the outer surface of said window pane is removed.

5. A window assembly for a motor vehicle door as set forth in claim 1, wherein the outer lip of said seal member is extended to provide an extension and the outer edge of the end of said window pane is covered by said extension.

6. A window assembly for a motor vehicle door as set forth in claim 2, wherein the outer lip of said seal member is extended to provide an extension and the outer edge of the end of said window pane is covered by said extension.

7. A window assembly for a motor vehicle door as set forth in claim 3, wherein the outer lip of said seal member is extended to provide an extension and the outer edge of the end of said window pane is covered by said extension.

8. A window assembly for a motor vehicle door as set forth in claim 4, wherein the outer lip of said seal member is extended to provide an extension and the outer edge of the end of said window pane is covered by said extension.

9. A window assembly for a motor vehicle door as set forth in claim 1, wherein said seal member is housed in a guide groove formed on said door frame and has an inner lip in contact with the interior side of said slide portion and which is elongated between said guide groove and said guide, whereby the length thereof in contact with said slide portion is enlarged.

10. A window assembly for a motor vehicle door as set forth in claim 2, wherein said seal member is housed in a guide groove formed on said door frame and has an inner lip in contact with the interior side of said slide portion and which is elongated between said guide groove and said guide, whereby the length thereof in contact with said slide portion is enlarged.

11. A window assembly for a motor vehicle door as set forth in claim 3, wherein said seal member is housed in a guide groove formed on said door frame and has an inner lip in contact with the interior side of said slide portion and which is elongated between said guide groove and said guide, whereby the length thereof in contact with said slide portion is enlarged.

12. A window assembly for a motor vehicle door as set forth in claim 4, wherein said seal member is housed in a guide groove formed on said door frame and has an inner lip in contact with the interior side of said slide portion and which is elongated between said guide groove and said guide, whereby the length thereof in contact with said slide portion is enlarged.

13. A window assembly for a motor vehicle door as set forth in claim 5, wherein said seal member is housed in a guide groove formed on said door frame and has an inner lip in contact with the interior side of said slide portion and which is elongated between said guide groove and said guide, whereby the length thereof in contact with said slide portion is enlarged.

14. A window assembly for a motor vehicle door as set forth in claim 6, wherein said seal member is housed in a guide groove formed on said door frame and has an inner lip in contact with the interior side of said slide portion and which is elongated between said guide groove and said guide, whereby the length thereof in contact with said slide portion is enlarged.

15. A window assembly for a motor vehicle door as set forth in claim 7, wherein said seal member is housed in a guide groove formed on said door frame and has an inner lip in contact with the interior side of said slide portion and which is elongated between said guide groove and said guide, whereby the length thereof in contact with said slide portion is enlarged.

16. A window assembly for a motor vehicle door as set forth in claim 8, wherein said seal member is housed in a guide groove formed on said door frame and has an inner lip in contact with the interior side of said slide portion and which is elongated between said guide groove and said guide, whereby the length thereof in contact with said slide portion is enlarged.

* * * * *